(12) United States Patent
Malet et al.

(10) Patent No.: US 6,347,332 B1
(45) Date of Patent: Feb. 12, 2002

(54) SYSTEM FOR NETWORK-BASED DEBATES

(76) Inventors: Edwin I. Malet, 315 Laurel La., Haverford, PA (US) 19041; Michael C. Row, 2008 Wallace St., Philadelphia, PA (US) 19130

(*) Notice: Subject to any disclaimer, the term of this patent is extended or adjusted under 35 U.S.C. 154(b) by 0 days.

(21) Appl. No.: 09/520,752

(22) Filed: Mar. 7, 2000

Related U.S. Application Data

(60) Provisional application No. 60/173,885, filed on Dec. 30, 1999.

(51) Int. Cl.[7] ............................................. G06F 13/00
(52) U.S. Cl. ..................... 709/205; 709/204; 709/219; 709/223
(58) Field of Search ................................ 709/204, 205, 709/206, 219, 223, 224, 313, 328, 329; 707/10, 104

(56) References Cited

U.S. PATENT DOCUMENTS

| | | | |
|---|---|---|---|
| 5,790,426 A | * | 8/1998 | Robinson .................... 702/179 |
| 5,793,365 A | | 8/1998 | Tang et al. ................. 345/329 |
| 5,872,850 A | | 2/1999 | Klein et al. .................. 380/49 |
| 6,112,186 A | * | 8/2000 | Bergh et al. ................. 705/10 |
| 6,128,613 A | * | 10/2000 | Wong et al. ................... 707/7 |
| 6,157,926 A | * | 12/2000 | Appleman et al. .......... 707/102 |

* cited by examiner

*Primary Examiner*—Viet D. Vu
(74) *Attorney, Agent, or Firm*—Woodcock Washburn LLP

(57) ABSTRACT

An Internet technology-based system (e.g., Web site) helps individuals filter and evaluate conflicting information through a process of online debate. The system leverages the inter-connection of the Internet to tap the expertise of users anywhere in the world, such that filtering and evaluation emerges dynamically from the process of communication and debate. In an illustrative implementation, the system infrastructure includes a data base, a rating process, community services, mechanisms for site organization and operation, and user interfaces. The database includes an argument base that structures discussion as a network of debates. The rating process operates directly and indirectly to accumulate the knowledge of the community for filtering and evaluating the information in the argument base. The argument base, rating process, and other elements of the system help users to quickly understand the key points of argument surrounding important issues without time consuming research, to identify the key facts or assumptions that are in contention while not having to think about extraneous and misleading rhetoric, and to support further research to explore specific points of interest in more detail.

17 Claims, 4 Drawing Sheets

System Architecture

FIG. 2  Key Database Entities and Relationships

Site Organization

Debate "T-account" Interface

SYSTEM FOR NETWORK-BASED DEBATES

This Application claims benefit of U.S. Provisional patent application Ser. No. 60/173,885 filed Dec. 30, 1999.

FIELD OF THE INVENTION

The present invention relates generally to the fields of computers and knowledge management, and more particularly to a system and method for filtering and evaluating information through on-line debates conducted over a network, such as the Internet.

BACKGROUND OF THE INVENTION

There has recently been a tremendous growth in the number of computers connected to the Internet. A client computer connected to the Internet can download digital information from server computers. Client application software typically accepts commands from a user and obtains data and services by sending requests to server applications running on the server computers. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the Gopher document protocol.

The HTTP protocol is used to access data on the World Wide Web, often referred to as "the Web." The Web is an information service on the Internet providing documents and links between documents. It is made up of numerous Web sites located around the world that maintain and distribute electronic documents. A Web site may use one or more Web server computers that store and distribute documents in a number of formats, including the Hyper Text Markup Language (HTML). An HTML document contains text and metadata (commands providing formatting information), as well as embedded links that reference other data or documents. The referenced documents may represent text, graphics, or video.

A Web Browser is a client application or an integrated operating system utility that communicates with server computers via FTP, HTTP and Gopher protocols. Web browsers receive electronic documents from the network and present them to a user. The Web is continually evolving with new standards and protocols: Cascading Style Sheets, client-side JavaScript, and XML to name a few. Moreover, the Web is evolving from the passive serving of static documents to an environment of dynamic and distributed processing. Java applets, ActiveX controls, DCOM, Server side scripting and others have stretched the boundaries of what was traditionally "the Web".

An intranet is a local area network containing Web servers and client computers operating in a manner similar to the World Wide Web described above. Typically, all of the computers on an intranet are limited to one company or organization.

The present invention is most suited to, but not limited to, uses in connection with the Internet. It may also be deployed on intranets and extranets utilizing Internet standards and protocols as well as other LANs and WANs. It is not limited to any particular network protocol, such as TCP/IP or HTTP, or any particular client or server technology, such as a particular browser, Web server, or operating system.

The Internet and related technologies are enabling unprecedented levels of communication and access to information. Under the weight of this abundance of information, traditional mechanisms for filtering and evaluating information are breaking down, with negative results for society and public policy. It is becoming very difficult for citizens to determine what is "true", or even to identify the key points of contention, in areas as diverse as science, medicine, domestic policy, foreign policy, and history. Anybody can erect a Web site, gaining wide audiences for distortions, lies, and misinformation (e.g., holocaust denial). And once the information is made accessible via the Internet, people can consume it without understanding its source or its veracity. Quackery is put on par with peer-reviewed research.

The problem of filtering and evaluating information impacts all aspects of modern life:

An overworked doctor trying to understand the best treatment for high blood pressure in the face of an explosion in alternatives and conflicting research results.

A day-trader led astray by Internet "news" of dubious origin and intent.

A housewife lured into a pyramid scheme.

A lawyer making sense of the maze of laws, regulations, and rulings on emerging topics.

Traditionally, information sources were responsible for filtering and evaluation. Newspapers and TV news organizations had fact checkers, editorial review, and strict standards of reporting. Academic journals had double-blind peer review of articles. The more rigorous the filtering and evaluation, the more respected the source, hence information from the New York Times is more credible than that from other less respected publications.

This system is strained to breaking in the Internet world. Rather than a few widely known sources, information consumers are confronted with thousands of sources. The amount and velocity of information (and related competitive pressures) are so great that even established sources are diluting, compromising, or abandoning their role as information gatekeepers.

A goal of the present invention is to provide a system for helping individuals filter and evaluate conflicting information through the process of on-line debates among a community of interested and informed individuals. The present invention is particularly, but not necessarily, intended for use in supporting on-line debates over the Internet.

SUMMARY OF THE INVENTION

The present invention provides an Internet technology-based infrastructure and processes for supporting on-line debates among a community of interested and informed individuals with the goal of helping individuals filter and evaluate conflicting information, claims, arguments and evidence regarding complex issues of fact, policy or belief. Unlike the centralized control over filtering and evaluation inherent in traditional published information sources (e.g., a newspaper), the present invention leverages the interconnection of the Internet to tap the expertise of users anywhere in the world: filtering and evaluation emerges dynamically from the process of discussion and Debate among interested parties.

The core of the invention is the Argument Base and a Rating Process. The Argument Base organizes discussion into a network of Debates comprising a Proposition under contention and Arguments and Evidence supporting or denying that Proposition. The Rating Process operates to allow the best Arguments and Evidence to be easily identified as well as to identify the key points of controversy in a complex debate. Ratings operate in the Debates much as currency does in an economic system: as a measure of value and as a limited resource that must be conserved and allocated efficiently by participants in order to maximize their interests. Incentives and controls are established so that self-interested behavior by individual participants yields desirable global results: in this case, quality discourse.

In the presently preferred implementation, the infrastructure includes a database, a multi-dimensional direct and indirect Rating Process, Community Services, mechanisms for site organization and operations, and user interfaces. These elements of the invention may be summarized as follows:

The database, in addition to the Argument Base, includes a Reference Library, a Community Directory, Comments and Evaluations, and various supporting information.

The Rating Process "weights" Arguments, References, and users based on the collective expertise and beliefs of participants. Stronger Arguments and Evidence, higher quality sources, and individual expertise will "bubble" up. It is this mechanism that supports the filtering and evaluation functions of the invention.

The Community Services control access to, and the ability to contribute to, the Debates. The quality of a Debate is directly related to the quality of participants. The invention incorporates Community Services to support Members as well as hold them accountable to the community. Community Services tracks users' Credentials and contributions and makes this information available to the Rating Process and, where authorized, other users.

Mechanisms for site organization and operations organize the Debates and Arguments in a way that is meaningful to, and easily navigated by, users. In the presently preferred implementation, the Argument Base is organized into Issue Rooms which are grouped into a topic hierarchy. This supports navigation as well as administration of the site.

User Interfaces are the means by which users interact with the system. In the preferred implementation, users interact with the Argument Base through a "T-Account" interface showing the pro and con Arguments and Evidence sorted by strength as measured by the Rating Process. This allows easy apprehension and navigation of complex discussions.

The present invention allows professionals and interested others to quickly understand the key points of argument surrounding important issues, without time consuming research. It supports achieving consensus where possible on issues of truth or policy. Where consensus is not possible, the structure of the Argument Base supported by the Rating Process help to identify the key facts or assumptions that are in contention, channeling Debate towards key or pivotal issues and reducing effort spent on extraneous and misleading rhetoric. The structure of the Argument Base and the Reference Library support further drilling down to explore specific points of interest in more detail. The more egregious problems of public discourse are reduced:

"Red Herring" issues can be countered.

"Talking past" opponents is reduced, as the strength of a Proposition depends not only on the strength of support, but on the weakness of opposition. A proponent cannot ignore a strong counter-argument.

The common tactic of equating repetition with truth is countered as a statement can be made only once. After that, one can support it or counter it, but cannot just say it again.

It is difficult to misquote or take statements out of context when the original source is a hyperlink away.

The implications of effective, Internet-supported Debates are significant, altering areas as diverse as professional education, scientific research, and political decision-making. The present invention is a step in this direction. These and other aspects of the present invention are described in greater detail below.

DETAILED DESCRIPTION OF PREFERRED EMBODIMENTS

The present invention provides an Internet technology-based infrastructure and processes for supporting on-line Debates among a community of interested and informed individuals with the goal of helping individuals filter and evaluate conflicting information, claims, arguments and evidence regarding complex issues of fact, policy or belief. As noted earlier, the presently preferred implementation includes a database, a Rating Process, Community Services, mechanisms for site organization and operation, and user interfaces. These elements are shown schematically in the appended drawings. After discussing the technical architecture implementation, we explore the implementation of each of these elements in more detail. We conclude with a review of some of the deployment options for the preferred implementation.

(a) Technical Architecture

Figure 1:
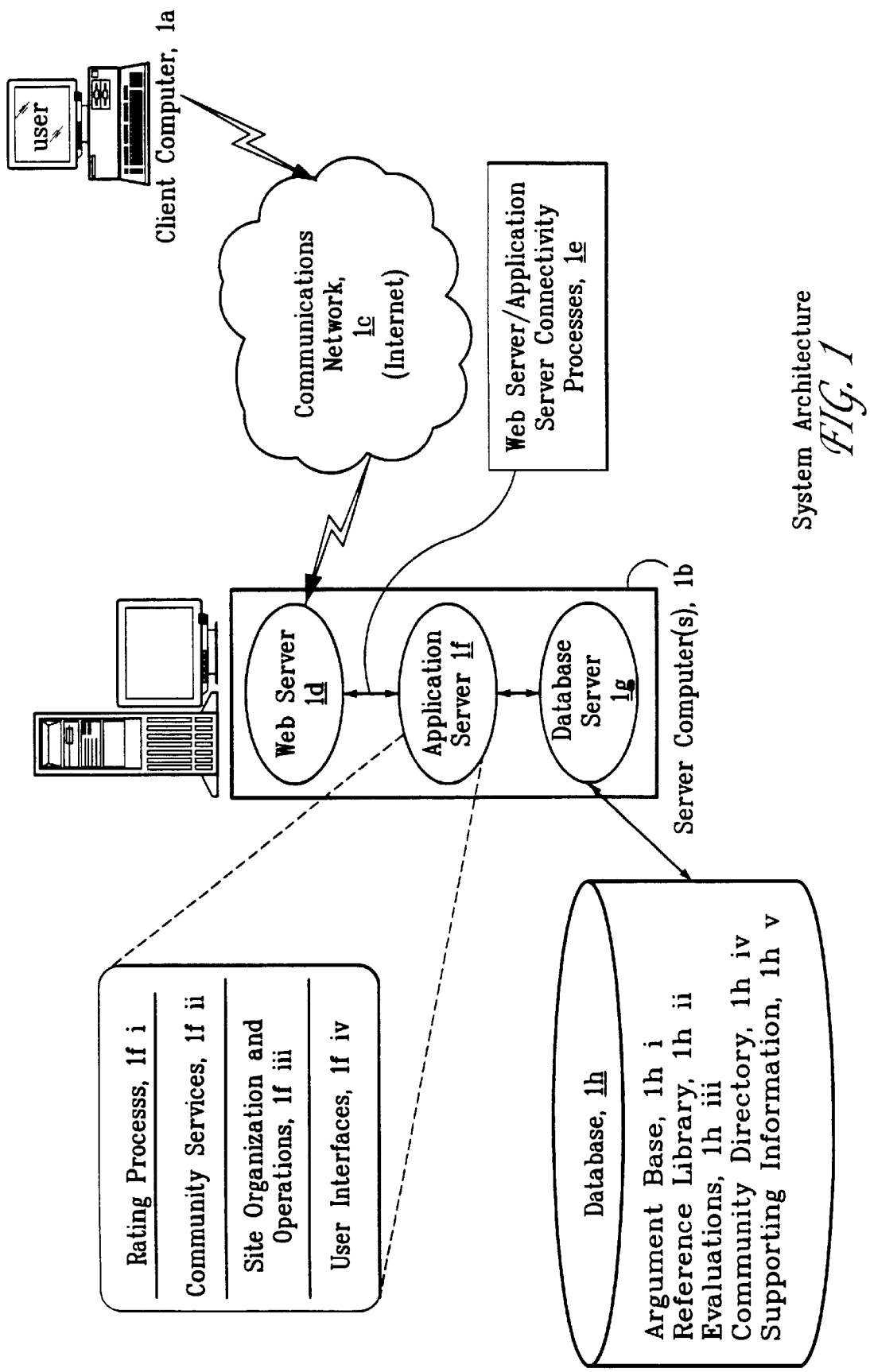
FIG. 1 schematically depicts a network-based system for filtering and evaluating information through on-line Debates in accordance with the present invention.

The technical architecture of the presently preferred implementation includes the following elements (see FIG. 1):

A standard Web browser (element 1a) such as Netscape Communicator or Microsoft Internet Explorer running on a user's computer and supporting client-side scripting such as JavaScript or VBScript.

One or more server computers (element 1b) running one or more instances of the server processes.

A communications network connecting the client computer(s) to the server computer(s) (element 1c). In the preferred implementation, the network supports the Internet protocols TCP/IP and HTTP.

A standard Web server (element 1d) such as Microsoft Internet Information Server supporting connectivity to the application server processes through Microsoft Active Server Pages (ASP) and ActiveX Server controls. The Web-server/application server connectivity processes (element 1e) render the user interface into HTML plus client side JavaScript for transmission to the user's Web browser. They also translate the user's commands and information into a format understandable by the application server processes for processing.

Application server processes (element 1f) that perform the processing tasks of the application, including the Rating Process, Community Services, Site Organization and Operation, and the User Interface. These processes are discussed in more detail in subsequent sections.

Database Management System (DBMS) (element 1g), such as Oracle and SQL Server, are server processes that connect the application server processes to the application database (element 1h).

The invention is by no means limited to this architecture. Alternatives include (but are not limited to):

In the preferred implementation, the user interface (UI) is implemented through HTML rendered by the server with minimal client processing through client side JavaScript. More processing could be distributed to the client computer through the use of Java applets, ActiveX controls, or other distributed computing technology. Alternatively, a pure HTML interface could be implemented with no client-side scripting.

In the preferred implementation, the communications network is the Internet. Alternatively, the invention could be implemented on an intranet, extranet, LAN, or WAN.

In the preferred implementation, the client and network communications are based on widely accepted Internet standards (TCP/IP, HTTP, HTML, JavaScript, etc.). Alternatively, the invention could be implemented with a proprietary client process or with other network and distributed processing protocols, such as Netware, DCom, or CORBA.

In the preferred implementation, interaction between the application and the Web servers is implemented through Microsoft Active Server Pages with ActiveX Server Controls. This interaction could be implemented with lower level Application Programming Interfaces (API) or through Java Server Applets. Alternatively, Web server functionality could be built directly into the application server.

The implementation may also include middleware, such as Microsoft Transaction Server or Tuxedo transaction processor.

The implementation may employ new tools, standards, and protocols as they develop.

(b) Database

The application database (element 1h) stores the information used by and manipulated by the application server process. The key areas of information stored in the application database include:

The Argument Base (element 1h(i))—Debate and discussion stored as a network of propositions linked by logical relationships.

The Reference Library (element 1h(ii))—Information on sources outside of the debate that are inform the debate and are linked to specific statements and assertions in the argument base.

Evaluations (element 1h(iii))—Individual users' judgements about elements in the argument base and reference library and other objects in the system (including other users). These judgements include numerical ratings that are used by the rating process to filter the information in the system.

Community Directory (element 1h(iv))—Information on members and contributors, including their profiles and credentials.

Other Supporting Information (element 1h(v))— Additional information to support the organization and operation of the system.

Figure 2:
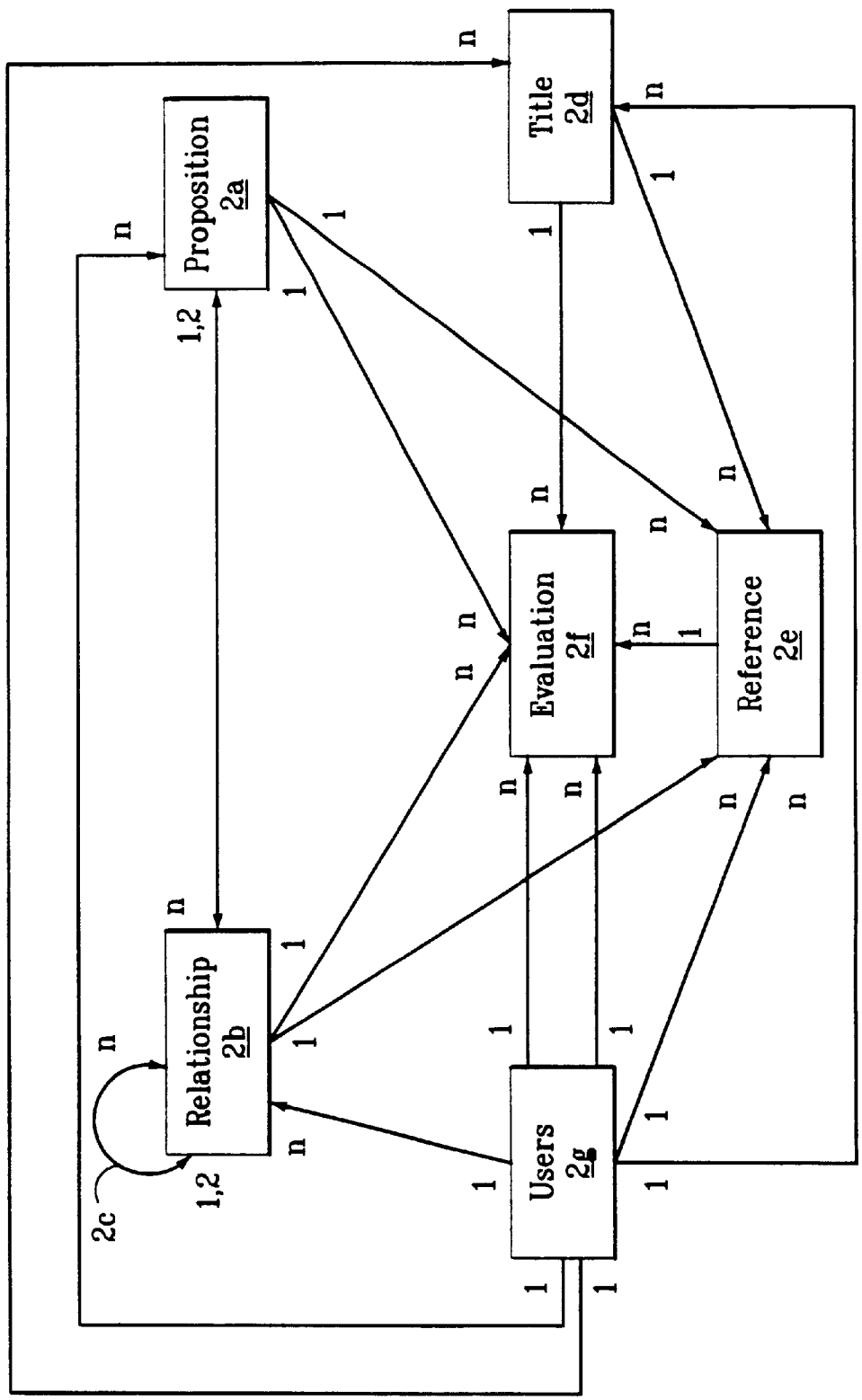
FIG. 2 depicts the currently preferred implementation of the data model supporting the argument base and reference library in the present invention.

The key entities relationships in the application database are depicted in FIG. 2 and are discussed below.

Argument Base

The heart of the system is the Argument Base. The Argument Base represents the structure and evidence of argumentation at a level high enough to be easy to understand and navigate, yet low enough to facilitate control of the Debate process and to permit evolution of the controls as more is learned about the dynamics of on-line Debates. In particular, the Argument Base structures discussion, argumentation, and Debate to:

Enable quick and comprehensive understanding of all positions on an issue;

Allow distillation of the an issue's key points, central issues, and critical facts;

Simplify drill-down to supporting detail, evidence, references, and sources, "separating the wheat from the chaff".

Discourage unproductive repetition of points.

Compel joinder of argument, i.e., that Debaters address opposing points and not "talk past" them.

Encourage logical, as opposed to emotional, argument and rhetoric.

Limit manipulation of information, and misinformation.

The basic objects in the Argument Base are Propositions (element 2a) and Relationships (element 2b). A Proposition is a statement of fact or belief, such as "There is no fossil evidence of evolution," or "All life evolved through the mechanism of natural selection." Of course, the truth or falsity of most Propositions will likely be in contention.

A Proposition may be supported by, or attacked by, other Propositions and evidence. In turn, that same Proposition may support or attack other Propositions. In the preferred implementation, these links are termed Relationships and may be of the following types:

Supports—for Propositions A and B, A supports B when if you accept A as true, you are compelled to believe that B is true. This is related to the formal logic implication operator, but admits degrees of support.

Denies—for Propositions A and B, A denies B when if you accept A is true, you are compelled to believe B is false. This is related to the formal logic implication operator plus negation, but again admits degrees of denial.

Equivalence—for Propositions A and B, A is identical to B.

The architecture of the preferred embodiment is general enough to accommodate more advanced logical operators and constructions, such as AND and OR. The architecture also permits using relationships to construct logical statements out of other relationships (element 2c). The Argument Base is thus a network of Propositions linked by rules of logic and evidence.

Reference Library

In the preferred embodiment, argumentation is ultimately grounded in sources external to the Debate. The Reference Library is a catalog of books, journal articles, Web articles, and other published material. The Reference Library contains a bibliographic reference at a minimum, which are termed Titles (element 2d). It may also contain a link to an electronic version of the document. References (element 2e) are links between Titles and Propositions or RelationshipsRelationships. They are the mechanism used to link sources to the debate as represented in the argument base. Users are able to navigate to sources from the points in the Debates where those sources are used as well as navigate from sources to the points in the debates where those sources are used.

Evaluations

Member judgements about Propositions, Relationships, Titles, References, and even other Members in the system are stored in the database as Evaluations (element 2f). Evaluations include numerical ratings that are used by the Rating Process (discussed below) to filter and prioritize objects in the Reference Library and Argument Base.

Community Directory

The application database also tracks information on users of the system, i.e. members of the debate community (element 2g). The User entity tracks a member's profile information, credentials, and other information that supports the operation of the system and work of the community. A user is also linked to his contributions, including Evaluations and submitted Propositions, Relationships, Titles, and References. This information is available to the community to enhance responsibility and accountability.

Functions of the system to support individual members and the operation of the community are discussed further below under Community Services.

Other Database Entities

Other entities in the Database include:

Comments—Member comments and elaborations not part of formal argument structure and evaluations. (Discussed further under Rating Process below.)

Topics—Hierarchy of Topic Areas for categorizing and navigating the Argument Base. (Discussed further in Site Organization and Operation.)

Issues—Catalog of Issue Rooms for accessing and navigating the Argument Base. (Discussed further in Site Organization and Operation.)

The Database also includes a complete chronological Archive of all activity in the system. This supports the transparency of the process as well as improves usability (Members can easily review new activity).

(c) Rating Process

Not all sources are equal—peer reviewed primary research from New England Journal of Medicine counts more than a newspaper article. For that matter, not all arguments or opinions are created equal. This brings us to the role of the rating process (element 1f(i)).

A goal of the present invention is decentralized, distributed control over the filtering and evaluation process. That is, filtering and evaluation occurs as the result of a dynamic process of discussion and ratings by different Members of the community with different points of view, information, and expertise. The strongest Propositions, Arguments and sources will have the highest ratings and will "bubble up" to the top of the Argument Base. To this end, every object and action in the system is subject to comment and rating by the community, even other Members. A simple rating system may easily be manipulated to serve individual interests. The present invention envisions a rating process combined with transparency, incentives and controls to support objective and quality discourse. Transparency, the ability for all Members of the community to see all activity in the rating process, increases Member accountability and peer pressure enforcement of group norms. Incentives in the rating process seek to construct a system where individual self-interest serves the objectives of the community, much as the tax code seeks to incent behavior for the benefit of the nation. Controls are more direct restrictions on the rating process designed to limit dysfunctional behavior.

The idea of Web-based community rating (individual users assigning or selecting a numerical rating of an item and those ratings being combined in some fashion to form a Summary Rating of that item) is not new. Amazon.com allows readers to comment on and rate books, with the Summary Rating being the average of the individual direct ratings. eBay permits community rating of other users. More recently, Amazon.com has even permitted rating the ratings. The present invention differs from existing community rating processes in several respects:

User ratings of an item may be multi-dimensional and dependent on what type of object the item is. Rather than have just one type of object in the system (e.g., books) and just one dimension for rating (e.g. quality), the invention envisions multiple types of objects (e.g., Proposition, Relationship, Source, etc.) each of which may have multiple rating dimensions that can differ among the object types.

Summary Ratings for multiple objects may be combined to form Indirect Ratings of other objects. In particular,
the Summary Rating of a Member combined with his Credentials can increase or decrease the weight of that Member's ratings of other objects. Thus, a highly rated Member's ratings count for more in the system than a lowly rated Member.
the Summary Rating of a Proposition is a function of the ratings of the Arguments and Evidence supporting or denying that Proposition.

The ratings process includes transparency, incentives and control to improve the quality of ratings.

The ratings process is combined with community processes to improve the quality of ratings.

Direct Ratings

In the presently preferred implementation of the invention, each registered Member may comment on and rate any object in the system: Propositions, Relationships, Reference Library Items, References, or other Members. These are termed "Direct Ratings" as they require direct action by Members. Ratings are numerical values entered or selected by the user. The scales for ratings are parameter driven. The number of and meaning of ratings differ based on what type of object is being rated. In the present embodiment, the following ratings are defined (though the architecture is flexible enough to easily add/modify/delete new ratings dimensions):

Propositions—Propositions are directly rated by degree of subjective belief in the "objective" truth or falsity of the Proposition. For example, a Member may give the Proposition "suburbs lead to the decay of community" a "truth" rating of 6 on a scale from 0 to 10, indicating that he or she believes the Proposition to be slightly more likely to be true than not.

Relationships—the truth of a Proposition is different from the truth of a logical statement using that Proposition. For example, the statement "IF Proposition A is true THEN Proposition B MUST be true" may be believed to be true even though it is believed that Proposition A is in fact false or even that Proposition B is in fact True. In the current implementation, Relationships are directly rated by degree of subjective belief in the "objective" truth or falsity of the logical statement or Argument created by the Relationship between two Propositions.

Reference Library items—Library items are directly rated by subjective assessments of quality and novelty. In addition, Members can rate and comment on authors and editorial sources References (links between a source and a Proposition or Relationship)—References are directly rated by accuracy/relevance, i.e., whether or not the source really says or concludes the Proposition or Relationship.

Members—Members are directly rated based on subjective assessments of knowledge and quality of discourse.

Indirect Ratings

In this invention, the Summary Rating of an object depends not just on the Direct Ratings of that object by the Members, but also Indirect Ratings. Direct Ratings are subject to manipulation. Individuals may use their ratings to damage opposing views or help their own views regardless of the merits of the individual Propositions or Arguments. A point of view that can mobilize the largest number of advocates will tend to prevail in a direct rating system. The present invention seeks to moderate the distortions and abuses of a direct rating system by incorporating Indirect Ratings, that is, the Summary Rating of an object depends on the Summary Ratings of related objects. By designing the appropriate linkages among objects and ratings, incentives are created that guide self-interested behavior of individuals towards the global objectives of objectivity and quality discourse.

The two most important indirect rating relationships are Member-weighted Ratings and Debate Ratings. In the present invention, all Members are NOT created equal. Each Member has a Contribution Weight that is determined by that Member's reputation, Credentials, and history in the community. This Contribution Weight determines how important that Member's ratings are to the system, enabling the system and the community to discipline and reward Members. For example, a partisan extremist may, over time, receive a very low Contribution Weight that would act to discount his ratings. (Contribution Weights are discussed more under Community Services below.)

Indirect Ratings are also critical to the Debate process in this invention. As noted earlier, a Proposition in the Argument Base can be directly rated by Members, but it can also be attacked or supported by Argument (other Propositions and Relationships) or Evidence (Reference Library items and References). In the present invention, the Summary Rating of a Proposition is a function of the Summary Ratings of the supporting or attacking Arguments and Evidence. Of course, those Arguments and Evidence are also subject to further Arguments and Evidence. These indirect Debate ratings create an incentive for proponents and opponents to expand the Debate. It is not enough to simply expound your point of view, you must also counter your opponent's Arguments and Evidence.

In the current preferred implementation, the following Summary Ratings are used:

Members—a Member's Summary Rating is a function of Member-weighted Direct Ratings (knowledge and quality of discourse) and History quality (Summary Rating increases with the number and value of contributions and decreases by number of low-rated contributions).

Library Sources—Summary Rating is a function of Member-weighted Direct Ratings of the source (quality and novelty), the type of source (e.g. primary research weighted higher than a survey), the Member-weighted Direct Ratings of the author, and the Member-weighted Direct Ratings of the editorial source (e.g. New York Times weighted higher than the National Inquirer).

Propositions—the Summary Rating is a function of Member-weighted Direct Ratings of the Proposition, Summary Ratings of supporting and denying Propositions weighted by the Member-weighted direct rating of the Relationship, and Summary Ratings of Library sources weighted by the Member-weighted direct rating of the reference link.

The Summary Rating of Propositions is a recursive algorithm. The algorithm terminates at Propositions with no supporting or attacking Arguments, at Reference Library items, or where circuit detector logic detects that the Proposition has been "visited" before.

Additional Controls and Incentives

In addition, there are additional controls and incentives in the preferred implementation to improve the quality of discourse:

1. Each Member can have only one vote per object (to prevent "stuffing the ballot box").
2. Each Member's vote is public information.
3. At any Proposition, each Member is given a set number of "votes" (essentially ratings points) to deploy among the Propositions and inferences supporting that Proposition. For example, if a Proposition, A, has 5 Arguments FOR and 5 Arguments AGAINST, a proponent cannot score all 5 Arguments FOR as 10 (0 to 10 scale) and all Arguments AGAINST as negative 10; users have a fixed number of points, say 30, that they can apply either for or against the various Arguments—this forces judgement. The number of votes is a function of the number of supporting links and is parameter-driven. This creates an incentive NOT to add similar or redundant propositions as that will simply dilute the strength of your position.

Initially the roll-up algorithms will be based on linear combinations, but the system is flexible enough to experiment with alternative formulas and evolve the process as more is learned about the dynamics of online Debate. Moreover, the currently preferred implementation allows weightings to be defined for each Issue Room to allow editors to tailor the rating process to the needs of the specific issue and community. For example, an issue of fact ("Is a high-protein diet effective for heart disease?") may warrant an extremely LOW weight on Direct Ratings and a HIGH weight on indirect Debate ratings. This increases the incentive to add Arguments and Evidence to the Debate. Alternatively, an issue of belief ("Is human life sacred?") may not warrant a high weight on indirect Debate ratings.

To facilitate transparency and participation while not compromising the Argument Base, the current implementation supports unlimited Comments. Like ratings, any object in the system can be commented upon. These Comments can be viewed from the Argument Base and appear in the chronological discussion archive, but have no impact on the permanent argument or ratings.

(d) Community Services

The quality of a community depends on accountability. In the present invention, not all contributions are created equal: a Nobel laureate in the topic area is different from an interested and informed amateur who is different from a narrow-minded ideologue. But in a Web environment who is who? The present invention's Community Services (element 1$f$(ii)) supports these realities.

Basic Membership

At the highest level, a user may be a Visitor or a Member. Anyone can visit the site. Visitors may view and comment, but their Evaluations do not "count" (i.e., are not included in the Rating Process). Moreover, a Visitor may not contribute new Arguments or Evidence. A Member, on the other hand, is a user who has registered with the system and who has the right to full participation in the Debates, including the right to rate objects and to contribute Arguments and Evidence. Transparency and accountability are supported through four basic Community Services—Profiles, History, Evaluations, and Credentials.

Community Transparency and Accountability

Members (registered users) may not be anonymous to the system in the current implementation. They must provide basic identification information and confirm their identity with a credit card. Members are encouraged to keep their identities and profiles public to the Debate community. For privacy concerns, they may choose to not make their identity and profile public to the community, although the current implementation supports imposing a penalty on their Contribution Weights (see below) for anonymity.

The current embodiment also supports transparency and accountability by making each user's (Visitor or Member) contribution history public. The contribution history tracks all Propositions, Relationships, Reference Library items, and references contributed, as well as all Comments and ratings submitted. Each user (Visitor or Member) may also be rated and commented on by other Members. All of the Ratings and Comments are public.

Users with published identities (credentialing is not available to anonymous Members) may chose to submit their credentials (degrees, positions, publications, etc.). The Member identifies the topics they are interested in being credentialed for and what level of credential they seek (level 1 through 5). Credentials are reviewed by the editorial staff and are published to the Membership. Other Members can challenge Credentials on fact, but the determination of level and areas is up to the editorial staff.

Contribution Weight

Each Member has a Contribution Weight, which is a function of the Member's Summary Rating and Credentials and is used in the rating process to calculate Member-weighted Direct Ratings. Each user's (Visitor or Member) has a Summary Rating which is calculated based on:

Other Members' (only Members' ratings "count") Direct Ratings of that user. The current implementation supports ratings of the user's knowledge and quality of discourse. These Direct Ratings are weighted by the raters' Contribution Weights.

Contribution history. In the current implementation, Summary Ratings increase with the number and average quality (as measured by that object's Summary Rating) of objects contributed. There is also an additional penalty factor for the number of low quality objects contributed.

The Contribution Weight used in the calculation of Member-weighted Direct Ratings is the Member's Summary Rating except for Propositions, Relationships, References, and Library items that have been categorized in topics for which the Member has Credentials. For those items, the Contribution Weight increases to reflect the Credentials.

The current implementation includes some flexibility and safeguards in implementing the Contribution Weights. Ratings by other Members can be appealed by the Member and can be overridden by the editors. The effect of Member ratings on a Members' Contribution Weight can be varied and will typically be the discretion of each Issue Room's Moderator.

Other Community Roles

The current preferred implementation includes the following roles for the Debate communities:

The Issue Room Moderator (or simply Moderator) is a Topic Area expert that has intellectual control over an Issue Room. Any issues of content or decorum are the responsibility of the Moderator.

Editors are employees who are responsible for day to day monitoring of activity. They will typically be assigned specific Topic Areas and Issue Rooms for which they are responsible. They have the authority to delete or modify posts to insure the quality and standards of the Issue Rooms. They are support for the Moderator.

Member Editors are Members that have been additionally screened to insure they have sufficient Credentials for their assigned Issue Rooms and that they agree to abide by the rules of the site. Member Editors are used in fully moderated Issue Rooms: all posts are routed to several Member Editors who vote on whether to include the post (See discussion of Organization and Operations below).

(e) Site Organization and Operation

Topics and Issue Rooms

Figure 3:
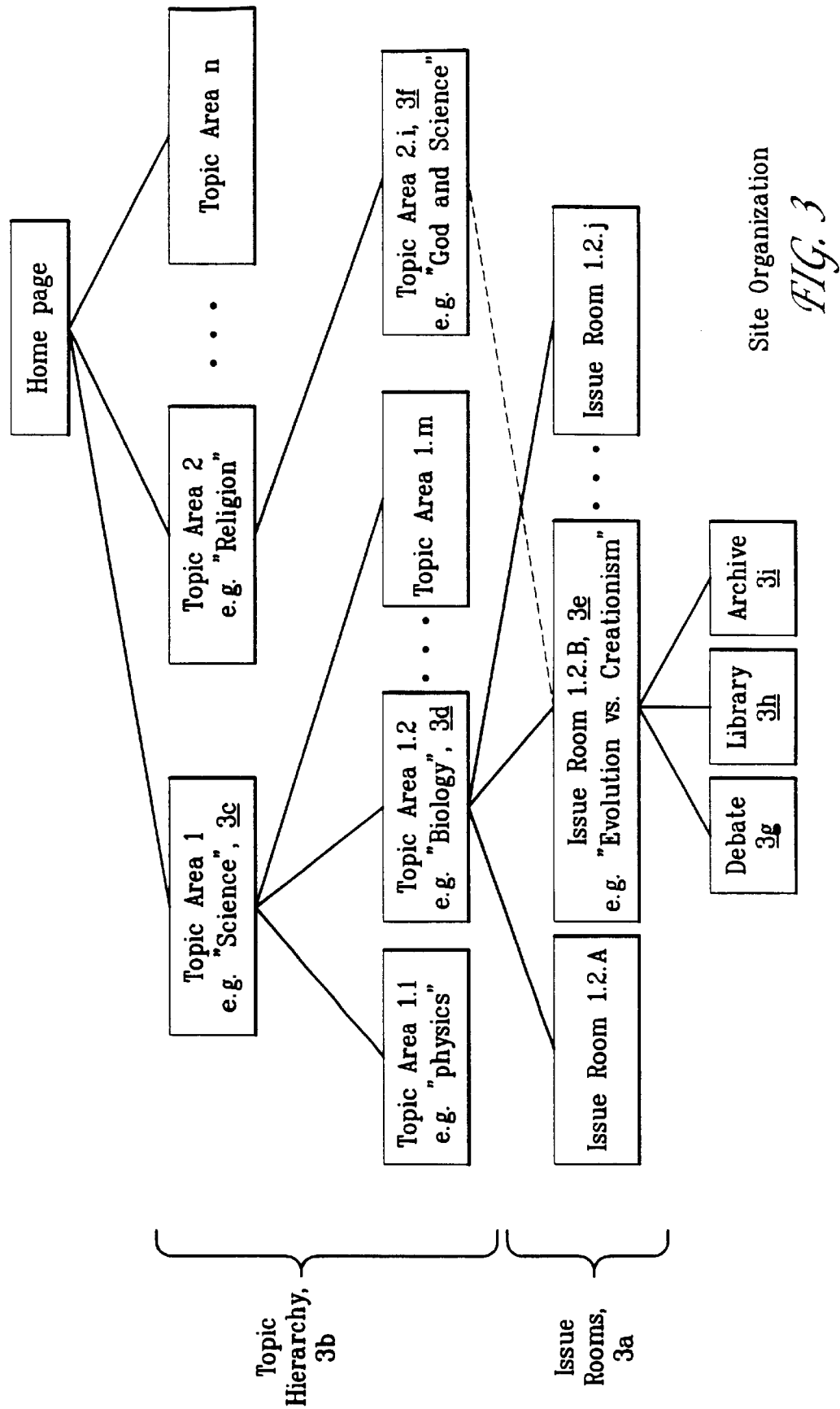
FIG. 3 schematically shows a schema for organizing a Web site in the presently preferred implementation.

The currently preferred implementation is a Web site organized into a hierarchy of Topic Areas and Issue Rooms (FIG. 3). Issue Rooms (element 3a) are defined by a narrowly drawn question or issue that is controversial either in fact or values/belief, i.e. a Proposition in the Argument Base.

Issue Rooms are organized in a hierarchy of Topic Areas (element 3b) that aid navigation and search. For example, the main Topic Area may be "Science" (element 3c), with a sub-area of "Biology" (element 3d) containing the Issue Room for the "Evolution vs. Creationism" debate (element 3e). An Issue Room is "owned" by only one branch of the Topic Area tree, but may be accessible from multiple trees. For example, the "Evolution versus Creation" Issue Room may be owned by Science:Biology, but may also be accessible through Religion:God and Science (element 3f).

In the current implementation, Topic Areas and Issue Rooms are set up by site editorial staff based on editorial and operational decisions of the site editorial organization. The Topic Area hierarchy is a fixed division of the "world". Topic Areas are also the categories used for user Credentials (see Community Services). Users may suggest changes in the topic hierarchy, but these are ultimately up to the Issue Room Editors to decide.

Issues also may be suggested by Members. In the presently preferred embodiment, issues require a moderator to be assigned and possibly also a sponsor. Issue Rooms are assigned to one or more nodes in the Topic Area hierarchy by the editorial staff.

Issue Room Organization

Issue Rooms are organized into three areas:

Debate (element 3g)—A hierarchical view into the Argument Base and References. The "root" of the hierarchy is the issue defining Proposition. Arguments and Evidence in support forms one "branch" of the hierarchy and Arguments and Evidence attacking is another "branch". Each of those Arguments and Evidence can lead to further Arguments and Evidence. As noted earlier, the Argument Base is implemented as a network, that is, a subsection of the Argument Base may be a part of multiple debates. However, the user's view and navigation is as a hierarchy.

Library (element 3h)—Each Issue Room has a Library of sources that have been used in the Debate. This is actually a filtered view into the Reference Library. By default, the sources are listed in decreasing Summary Rating order, but the user may customize the sort order, as well as to search.

Discussion Archive (element 3i)—The Issue Room also contains a chronological record of all activity in the Issue Room—Comments, ratings, new Propositions, new Relationships, new Library items, and new References. All editorial actions also appear in the discussion archive. The user has the ability to filter and sort the discussion archive as well as to search.

Subscriptions and Restricted Rooms

The present invention contemplates the ability to host Issue Rooms with varying levels of restriction.:

Public—Public Issue Rooms are open to all Members and Visitors

Restricted—Restricted Issue Rooms allow all Members to view and comment, but only subscribers may contribute and evaluate.

Private—Access and participation limited to specified Members. Private Issue Rooms do show up in the main index and topic hierarchy.

Private Label—Specialized Private Issue Rooms that appears as part of the host's Web site and not as part of the main site (e.g. as a service to other sites that desire the functionality).

The present invention supports invitations and subscription requests. The Issue Room moderator may send out invitations, which are tracked and when accepted permit the moderator to set the invited Member up as a subscriber. Alternatively, a Member may request a subscription to a particular Issue Room. The system tracks requests and the Issue Room moderator may either accept or deny the request. If accepted, the Member is set up as a subscriber.

Editorial Process Options

The presently preferred embodiment of the invention supports three models for adding to the knowledge base:

Editorial Oversight—Full distributed operation with editors stepping in only in the case of emergencies. Member contributions are immediately reflected in the knowledge base and sink or swim based on their Summary Ratings.

Public Comment—As above, editors are for oversight only. New submissions are posted for public discussion and after a period are either added to the knowledge base or discarded.

Fully Moderated—All submissions go through peer editorial review prior to entry into the knowledge base. A new submission will be routed to a number (parameter selectable by Issue Room) of Member Editors. If a certain number (again parameter selectable by Issue Room) of the editors accept the submission, it is added.

In the current implementation, all submissions for the Reference Library must go through review by Reference Library staff to check for accuracy and completeness and to determine whether the source is or can be made electronically available.

Revenue Models

The current implementation supports several different revenue sources:

Membership and Subscriptions. The system as the ability to require Membership or subscription payments at the Topic Level or at the Issue Room level.

Advertising and Sponsorship. The current implementation uses standard technologies to implement and track advertising and "click-throughs". Advertising space is sold by Issue Room as a sponsorship of that particular Issue Room.

Library Access. The current implementation supports charging for access to electronic sources. Access fees are charged to the Member's Library card which is periodically charged against the Member's credit card on file.

(f) User Interfaces

Figure 4:
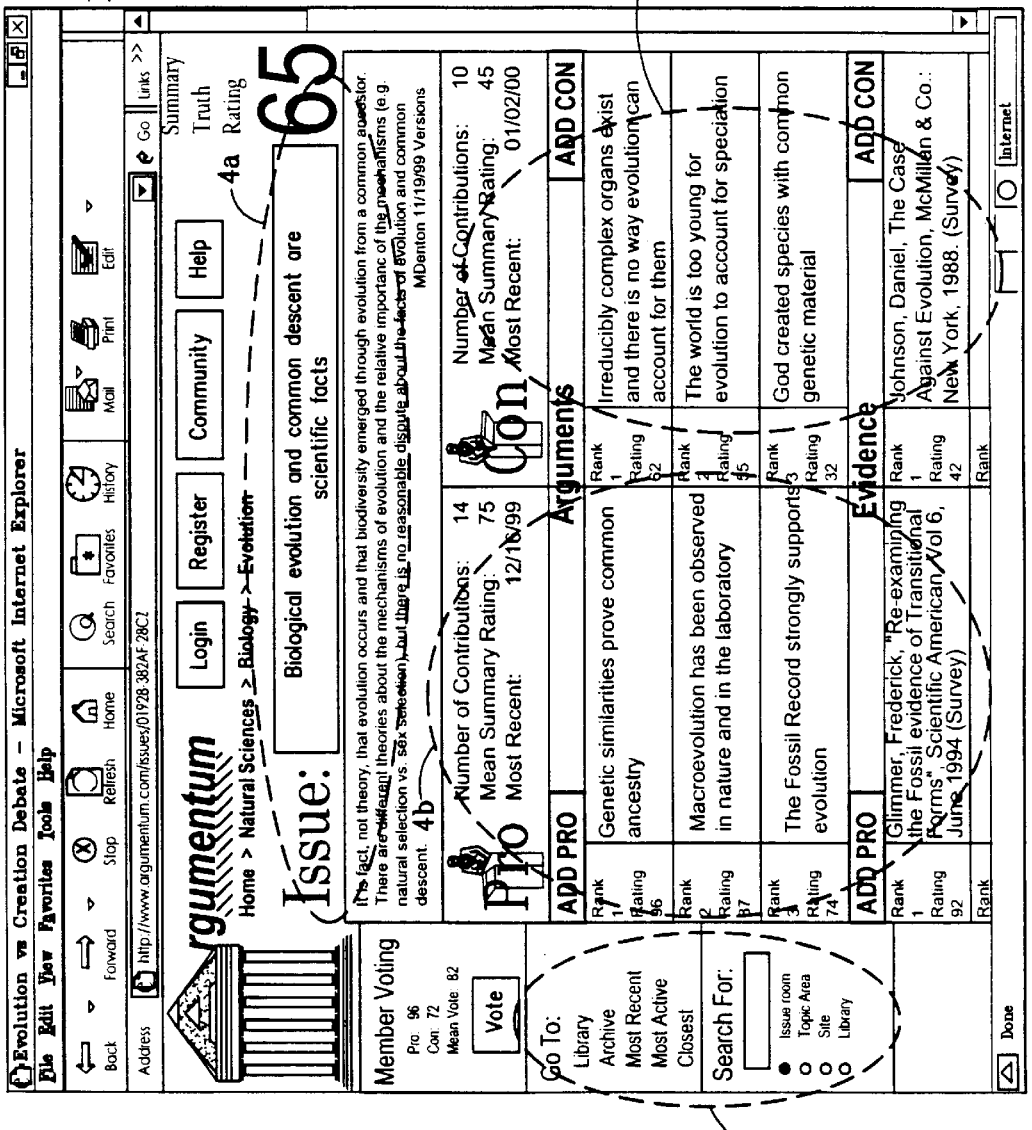
FIG. 4 depicts an illustrative user interface display (screen shot) for use with a Web site in accordance with the present invention.

In the current embodiment, user interfaces are implemented as HTML documents and HTML forms, with some client scripting. The basic interface for navigating the Argument Base is the "T-Account" (FIG. 4), showing the Proposition under consideration at the top (element 4a) and two columns below, one for Arguments and Evidence FOR the Proposition (element 4b) and one for Arguments and Evidence AGAINST the Proposition (element 4c). Arguments and Evidence FOR and AGAINST are sorted by Summary Ratings, with the highest rated items first.

Clicking (pointing with the mouse and depressing the left mouse button) on an argument displays a pop-up window that gives the user the option of 1) navigating to a page that displays more information about the argument and allows the user to rate the argument; or 2) "drill down" into the Argument Base, displaying that Proposition as the top of the "T-Account" and displaying Arguments and Evidence for and against that Proposition in the columns below. Clicking on an evidence item displays a pop-up window that gives the user the option of 1) navigating to a page that displays more information about the reference and title and allows the user to rate those objects; 2) navigate to the bibliographic record for the title in the Reference Library; or 3) navigate to the source document for the Title, if it is available.

The basic "T-account" page also allows the user to search the issue room or the entire site and navigate to the Reference Library or Discussion Archive for the Issue Room (element 4d).

(g) Deployment Options

The present invention has broad and various applications, including, but not limited to, the management of myriad intellectual, policy, scientific, and policy debates and discussions, e.g., Medical: What is the best treatment for . . . (high blood pressure, diabetes, depression, etc.)? How is managed care affecting quality of care? Is the residency system harmful or useful?

Legal: Are civil awards too high? Is there a legal basis for suing gun manufacturers?

Philosophy/Theology/Ethics: Is abortion/euthanasia moral? What is consciousness? Is vegetarianism more "moral" than meat-eating?

Sociology: Is affirmative action effective? Is gun control effective at reducing crime? Are welfare limits effective in increasing self-reliance?

Economics: Is the current economy a speculative bubble? Are business cycles dead in an information economy?

Politics: Should sanctions on Iraq be lifted? Should we sanction China for espionage and human rights abuses? What is the best solution for saving social security?

Education: Do school vouchers improve education quality and access? How does discipline/lack of discipline affect learning in high schools? Should elementary schools focus on fostering creativity or rote skills?

In addition, the inventors foresee various practical applications of the system, e.g., to support, enhance, and/or manage dispute resolution, strategic planning, market research, opinion polling, legislation, etc.

The current implementation supports several different business models for deployment:

Branded public Debate-oriented Web sites, supported by sponsors/advertisers, library access charges and/or membership fees.

Limited access private networks belonging, e.g., to professional associations, corporations, universities, governments, etc.

Enhancements of discussion areas, chat rooms, and communities for existing Web sites operators, e.g., Yahoo, AOL Of course, the invention is not limited to these deployments.

(h) Conclusion

In sum, the present invention provides an improved system and method for filtering and evaluating information through a process of on-line Debates. The invention is particularly well-suited for (but not limited to) deployment over the Internet.

It is understood, however, that the invention is susceptible to various modifications and alternative constructions. It should be understood that there is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of database and database management applications. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic diskette) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

We claim:

1. A network-based system for filtering and evaluating information through a process of online debate, comprising:
   (a) a server computer operatively coupled to a network and accessible to a plurality of users via client computers coupled to the network;
   (b) a database operatively coupled to the server, the database including an argument base; and
   (c) a software process, supported by the server, for supporting the on-line debate process;
   wherein the argument base structures discussion as a network of debates;
   wherein the argument base includes object classes for Propositions and Relationships among those Propositions; and
   wherein Relationships link or associate a Proposition or Relationship with another Proposition or Relationship such that the combination forms a logical statement that can be determined as true or false; and
   wherein the logical statements include the concepts of supporting or denying a proposition, such that if a proposition, "A", supports another proposition, "B", then if A is in fact true then B must be true, and if A denies B, then if A is in fact true then B must be false; and where the logical statements also include the concept of equivalence, such that if a proposition, "A", is equivalent to another proposition, "B", then A and B are the same proposition.

2. A network-based system for filtering and evaluating information through a process of online debate, comprising:
   (a) a server computer operatively coupled to a network and accessible to a plurality of users via client computers coupled to the network;
   (b) a database operatively coupled to the server, the database including an argument base; and
   (c) a software process, supported by the server, for supporting the on-line debate process;
   wherein the argument base structures discussion as a network of debates;
   wherein the argument base includes object classes for Propositions and Relationships among those Propositions; and
   wherein the argument base comprises a network of propositions linked by rules of logic, such that, from a proposition, a user can identify key arguments for and against that proposition.

3. A network-based system for filtering and evaluating objects through a process of community rating, comprising:
   (a) a server computer operatively coupled to a network and accessible to a plurality of users via client computers coupled to the network;
   (b) a database operatively coupled to the server, the database including information on one or more object classes to be rated; and
   (c) a rating process supported by the server, wherein
      i) the rating process dynamically calculates and assigns a summary rating to items in the database, wherein the summary rating is a numerical value that represents a measure of quality, preference, value, or other means of prioritizing and organizing the records in the database; and
      ii) records of different object classes in the database have summary ratings where the meaning or interpretation of the summary ratings differs among and depends on the object class; and
      iii) inputs into the algorithm for calculation of the summary rating for a record in the database include direct ratings of the item by individual users, where a direct rating is a numerical value determined through user input and selected from a specified range or list of values for a specific record in the database; and
      iv) the number of direct ratings an item receives, the range or list of values for each direct rating, the meaning or interpretation of each direct rating, and the algorithm or formula for incorporating multiple direct ratings for an item into the summary rating, are different among and dependent on the object class to which the record belongs; and
      v) inputs into the algorithm for calculation of the summary rating for an item or record in the database include the summary ratings of other items in the system that are conceptually related to the focal item; these are termed "indirect ratings" as their value in part determines the summary rating of the focal item; and vi) the algorithm for calculating summary ratings is dynamic in that changes in direct ratings or indirect ratings are reflected in the summary rating in near-real time, which means immediately or within a time period that balances the operational efficiency of the system with the need for current information.

4. A system as recited in 3, wherein:

(a) an entity receiving summary ratings is the Members or Users of the system; and (b) Users' summary ratings are used to calculate "member weighted direct ratings", wherein the weight given to a direct rating in the calculation of an item's summary rating is affected by the summary rating of the user who made the direct rating, such that the higher or better the summary rating of the user, the more weight that user's direct ratings will have in the calculation of the summary rating of that item.

5. A system as recited in claim 4, wherein summary ratings of a user depends on member-weighted direct ratings of that user by other users.

6. A system as recited in claim 5, wherein the ratings of users further depend on the quality and/or quantity of that user's contributions.

7. A system as recited in claim 6, wherein the summary ratings of users further include a penalty for anonymity, such that the user's summary rating is higher if that user's profile is accessible by other members, and lower if that user's profile is not accessible by other members.

8. A system as recited in claim 7, wherein summary ratings of users further depend on a user's credentials, such that additional weight is given for particular expertise in specific areas.

9. A network-based system for filtering and evaluating information through a process of online debate, comprising: a server computer operatively coupled to a network and accessible to a plurality of users via client computers coupled to the network; a database operatively coupled to the server, the database including an argument base; and a software process, supported by the server, for supporting the on-line debate process; wherein the argument base structures discussion as a network of debates and includes object classes for Propositions and Relationships among those Propositions; wherein the software process for supporting the on-line debate process includes a rating process; and wherein the object classes receiving summary ratings include Propositions and Relationships; and the algorithm for calculating the summary rating for a Proposition assigns a summary rating that increases as the strength of argumentation for that Proposition increases or the strength of argumentation against that Proposition decreases; and decreases as the strength of argumentation for that Proposition decreases or the strength of argumentation against that proposition increases.

10. A system as recited in 9, wherein the algorithm for calculating the summary rating for a focal Proposition has, as inputs, the summary ratings of arguments supporting or denying that Proposition.

11. A system as recited in 10, wherein the summary rating for a focal Proposition increases with the truth value of arguments supporting that Proposition and decreases with the truth value of arguments denying that Proposition.

12. A system as recited in 11, wherein:

i. an argument supporting a focal Proposition is a Relationship representing the relationship logical implication, supports or implies, or some variant ("Supports Relationship"), and where another Proposition or Relationship is directionally linked to the focal Proposition;

ii. an argument denying a focal Proposition is a Relationship representing the relationship logical implication with negation, denies, contradicts, or some variant ("Denies Relationship"), and where another Proposition or Relationship is directionally linked to the focal Proposition;

iii. the algorithm for calculating the truth value of an argument includes as inputs, the summary rating of the Supports Relationship or Denies Relationship and the truth value of the Proposition or Relationship directionally linked to the focal Proposition by the Supports Relationship or Denies Relationship, such that the truth value of the argument increases with the summary rating of the Supports Relationship or Denies Relationship, and increases with the truth value of the Proposition directionally linked to the focal Proposition by the Supports Relationship or Denies Relationship; and iv. the truth value of a Proposition is its summary value from the rating process.

13. A system as recited in claim 9, wherein propositions and relationships can be supported or attacked with evidence, such that the summary value of a proposition or relationship increases with summary rating of the evidence supporting that proposition or relationship and decreases with the summary ratings of evidence attacking that proposition or relationship.

14. A system as recited in claim 13, wherein evidence is represented by object classes for Titles and References, where Titles are the bibliographical information on sources, and References are links between Titles and propositions and relationships in the argument base, such that Titles can be linked to propositions and relationships in a many to many fashion.

15. A system as recited in 14, wherein the algorithm for calculating the summary ratings of Relationships and Propositions include as inputs the summary rating of Reference items linking the Relationship or Proposition to a Title and the summary rating of the Title so linked, such that the summary rating of the Relationship or Proposition increases with the summary ratings of the Reference and the Title.

16. A system as recited in 13, further comprising a user interface that allows the user to navigate the argument base as a hierarchy showing the Proposition under contention across the top with two columns below; with a first column showing the arguments and evidence supporting the Proposition in decreasing order of summary rating; and with a second column showing the arguments and evidence attacking the Proposition in decreasing order of summary rating.

17. A system as recited in 16, where the user interface allows the user to drill down into the argument by double clicking on a PRO or CON argument, which causes the system to show that proposition and will query and display the related supporting and denying arguments.

* * * * *

UNITED STATES PATENT AND TRADEMARK OFFICE
CERTIFICATE OF CORRECTION

PATENT NO. : 6,347,332 B1
DATED : February 12, 2002
INVENTOR(S) : Edwin I. Malet et al.

It is certified that error appears in the above-identified patent and that said Letters Patent is hereby corrected as shown below:

Column 5,
Line 51, delete the word "are";

Column 9,
Line 21, delete the word "arc" and insert -- are -- therefor;

Column 13,
Line 53, delete the word "as" and insert -- has -- therefor.

Signed and Sealed this

Twenty-first Day of May, 2002

Attest:

JAMES E. ROGAN
Attesting Officer
Director of the United States Patent and Trademark Office